United States Patent [19]

Massa

[11] 4,183,011

[45] Jan. 8, 1980

[54] ULTRASONIC CLEANING SYSTEMS

[75] Inventor: Frank Massa, Cohasset, Mass.

[73] Assignees: Fred M. Dellorfano, Jr.; Donald P. Massa, both of Cohasset, Mass. ; Trustees of The Stoneleigh Trust u/d/t

[21] Appl. No.: 863,075

[22] Filed: Dec. 22, 1977

[51] Int. Cl.[2] .............................................. H04B 13/00

[52] U.S. Cl. ........................................ 134/184; 134/1; 366/127

[58] Field of Search ....................................... 340/8-14; 310/337; 134/1, 167, 168, 184; 15/1.7, 110, 114, 115; 366/127

[56] References Cited

U.S. PATENT DOCUMENTS

| | | | |
|---|---|---|---|
| 2,283,285 | 5/1942 | Pohlman | 340/8 LF |
| 2,775,434 | 12/1956 | Probst | 366/127 |
| 3,421,939 | 1/1969 | Jacke | 134/1 |
| 3,660,809 | 5/1972 | Pearson | 340/10 X |
| 3,700,937 | 10/1972 | Rissolo | 310/337 |
| 3,872,533 | 3/1975 | Proffit | 134/167 R |
| 4,064,885 | 12/1977 | Dussault | 134/184 |

*Primary Examiner*—Harold Tudor

[57] ABSTRACT

Improved ultrasonic cleaning of large surfaces is achieved by modifying conventional transducers of either the cylindrical or piston vibratile type so that the transducer vibratile element is brought in closer proximity to the surface being cleaned. For efficiently cleaning the wall surface of a circular water-filled tank, such as a toilet bowl, a ceramic disc operating in the planar resonant mode is provided with an acoustic transmission line comprising a solid annulus bonded to the periphery of the ceramic. The radial dimension of the annulus is equal to one-half wavelength of sound in the material at the frequency of operation. The annulus serves as an acoustic transmission line to extend the peripheral vibrating surface of the ceramic to a region closer to the wall of the tank. The transmission line also increases the radiating area of the transducer which achieves increased sonic power density in the vicinity of the wall surface. For a transducer having a piston type vibratile element, a plurality of rubber bristle-like tips surrounds the periphery of the transducer face and serve as spacers for keeping the transducer in close proximity to the surface of the structure being sonically cleaned while the transducer is moved over the surface. The rubber bristles also serve as a brush to wipe away the residue from the ultrasonically-cleaned surface.

8 Claims, 8 Drawing Figures

ULTRASONIC CLEANING SYSTEMS

This invention is concerned with improvements in ultrasonic cleaners and more specifically with improved ultrasonic cleaners in which high-intensity concentrated ultrasonic energy may be applied to the surface of a structure whose total area to be cleaned is very much larger than the area of the ultrasonic transducer employed for doing the cleaning. In prior art ultrasonic systems which have been successfully used for ultrasonic cleaning appllications, the area of the vibratile surface of the transducer employed in the cleaner has generally been a sizeable fraction of the area of the surface of the structure being cleaned. A particularly effective ultrasonic cleaner is illustrated in FIG. 1 of U.S. Pat. No. 3,464,672 which shows a cylindrical transducer element 12 whose radially vibrating surface is coupled to the outer surface of a cylindrical cup which contains the cleaning liquid within which the article to be cleaned is immersed. One reason for the successful cleaning achieved by this type of prior art design is due to the configuration and relatively large area of the transducer vibratile surface compared with the total size of the cleaning container which results in intense cavitation throughout the entire volume of the liquid. If, on the other hand, a cylindrical ultrasonic transducer were located along the center line of a tank whose diameter is much larger than the diameter of the transducer, and the radial vibrations of the transducer were to be used for sonically cleaning the wall surface of the tank, the cleaning action would not be very efficient because the cavitation level generated near the transducer surface would be diminished rapidly as the distance from the surface of the transducer to the surface of the tank increases. Also, the high cavitation level near the transducer surface would cause gas bubbles to be released from the liquid as it is torn apart by cavitation, and the presence of the gas within the liquid would greatly attenuate the transmission of the sound energy throughout the liquid, with the consequence that ineffective cleaning would take place at the wall surface of the tank.

The primary object of this invention is to improve the efficiency of ultrasonic cleaning of a surface whose total area is large compared with the vibratile area of the transducer utilized in the cleaning system.

Another object of the invention is to design a transducer for use in sonic cleaning capable of generating cavitation sound pressure levels in a liquid, with provisions for holding the cavitating transducer surface in close proximity to the surface of the structure which is being cleaned, and also to provide means for maintaining liquid coupling between the cavitating surface of the transducer and the surface of the structure being cleaned.

Still another object of the invention is to design a transducer with an annular, ring-shaped transmission line acoustically coupled to the periphery of a radially vibrating transducer element for the purpose of extending the effective diameter of the vibratile surface of the transducer closer to the proximity of the wall of the tank within which the transducer is immersed.

Another object of the invention is to design a transducer for use in sonic cleaning including transport means for bringing the transducer's vibratile surface in close proximity to the surface of a structure being cleaned, and also including additional means for maintaining liquid coupling between the vibratile surface of the transducer and the portion of the structural surface which is being sonically cleaned.

An additional object of the invention is to provide an acoustic transmission line coupled to each vibratile and face of an axially vibrating dual piston transducer, whereby the vibratile surface of each piston is transferred closer to the proximity of the tank wall containing a liquid within which the transducer is immersed.

A still further object of the invention is to provide mounting means for a transducer whose vibratile area is small compared with the area of the wall surface of a tank within which said transducer is immersed for the purpose of sonically cleaning the tank wall, and to provide transport means whereby the vibratile surface of the transducer may be moved about in close proximity to the wall and be made to scan the relatively larger area of the tank wall which is being cleaned.

Additional objects will become more apparent to those skilled in the art by the description of the invention which follows, when taken with the accompanying drawings in which.

Figure 1:
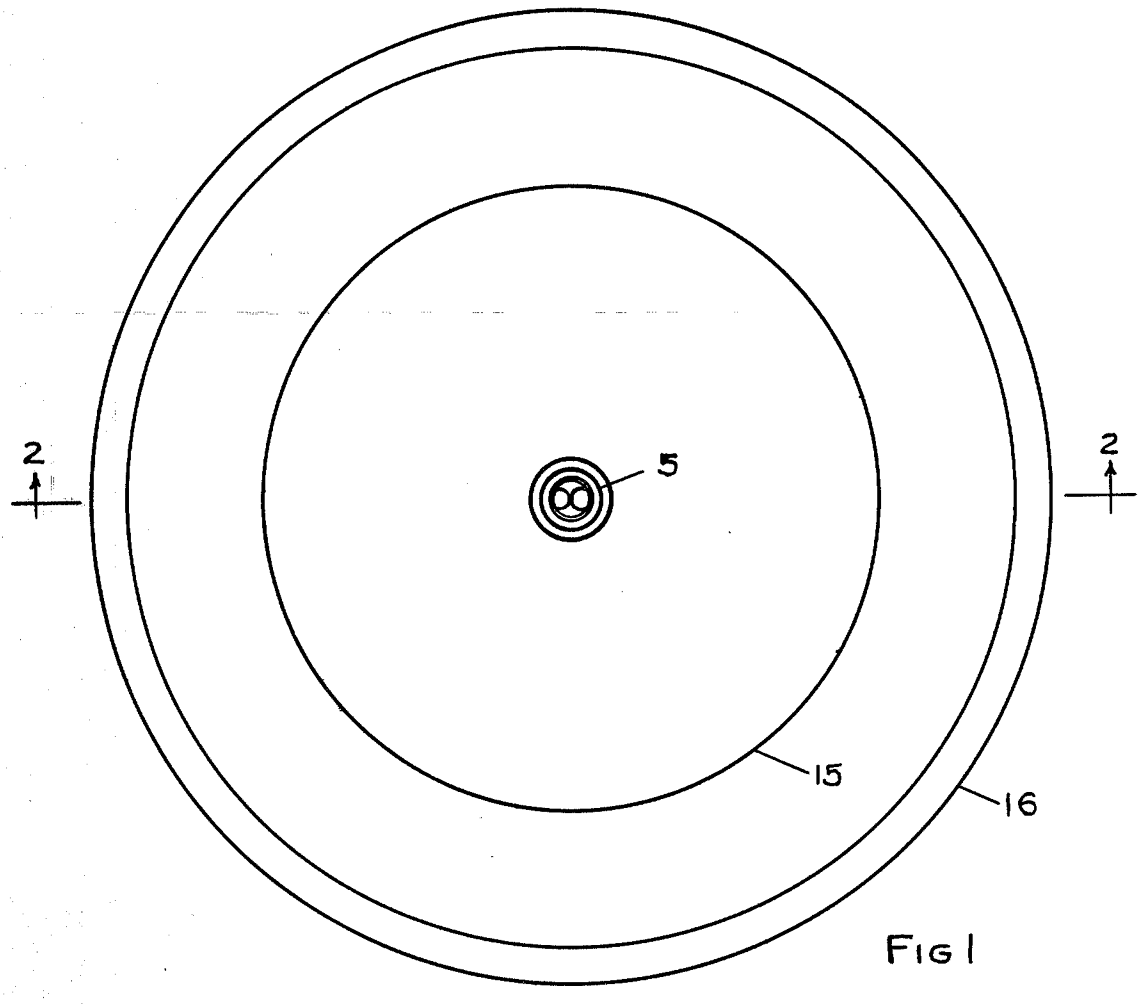
FIG. 1 is a plan view of a cylindrical tank containing a radially vibrating transducer employing one illustrative embodiment of this invention.
Figure 2:
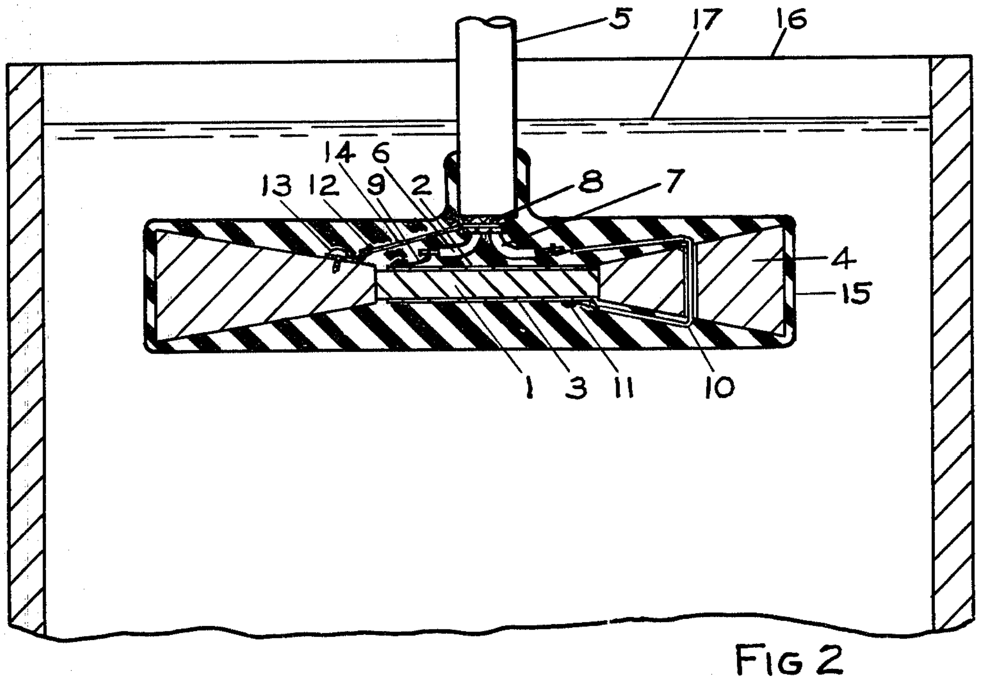
FIG. 2 is a section taken along the line 2—2 of FIG. 1.

Referring more particularly to the figures, FIGS. 1 and 2 illustrate one form of this invention which employs a radially vibrating transducer element comprising a polarized ceramic disc 1, shown in cross-section in FIG. 2. The ceramic element may be, for example, lead zirconate titanate with metallic electrodes 2 and 3 applied to the opposite flat surfaces of the disc in the conventional manner, as is well known in the art. The ceramic disc will be operated preferably in the planar resonant frequency mode. In order to extend the peripheral vibrations of the ceramic disc to a region of larger diameter, a washer-like solid annulus 4 is acoustically coupled to the periphery of the ceramic disc, as illustrated. The annulus 4 may be tapered, as shown in FIG. 2, and the vertical dimension at the outer periphery of the annulus is made preferably greater than approximately one-third the wavelength of the sound being generated in the liquid 17, so that efficient acoustic loading occurs when the transducer is operating. It is also preferable to make the radial dimension of the annulus 4 approximately one-half wavelength of the sound wave in the annulus material at the frequency corresponding to the planar resonant frequency of the ceramic disc in order that the annulus operates as an efficient transmission line for transferring the vibrations from the periphery of the ceramic to the outer periphery of the annulus.

In order to maintain good acoustic coupling between the periphery of the ceramic and the internal diameter of the annulus, a preferred design is to provide an interference fit between the mating parts. At assembly, the annulus is heated to cause the thermal expansion of the material to increase the diameter of the hole in the annulus sufficient for the annulus to fit over the ceramic and then become tightly engaged upon cooling. In order to advantageously provide a positive compressive stress bias on the ceramic, the interference dimension between the opening in the annulus and the periphery of the ceramic should be chosen so that, upon cooling of the annulus after assembly, the stress on the ceramic remains in the approximate range 2000–4000 psi. A thin cement film may be applied between the joined surfaces of the annulus and the ceramic to fill any microscopic irregularities between the surfaces.

After attaching the annular-shaped transmission line 4 to the periphery of the ceramic, a water-proof cable 5 with two insulated conductors 6 and 7 and a shield 8 is connected to the structure, as illustrated in FIG. 2. A flexible lead 9 is soldered to the tip of the conductor 6 and to the surface of the electrode 2, as shown. An insulated flexible conductor 10 is passed through a hole drilled into the annulus 4, as illustrated, and one end of the conductor is soldered to the tip of the conductor 7. The opposite end of the conductor 10 is attached to the electrode 3 by means of the solder 11. A terminal lug 12 is attached to the annulus 4 by means of the screw 13. An electrical connection is made by the conductor 14 between the terminal 12 and the cable shield 8, as illustrated in the drawing.

After completing the assembly of the mechanical structure, a sound-conducting rubber-like water-proof housing 15 is molded or potted over the assembly, making a complete water-proof unit. The completed transducer, as illustrated, is shown immersed in a liquid 17 which is contained in the tank 16. The tank 16, for example, could be a toilet bowl whose internal surface could be sonically cleaned by lowering and raising the transducer within the water-filled bowl. By expanding the vibrating peripheral surface of the ceramic 1 by the use of the efficient annular transmission line 4, the objectives of this invention are achieved. The cavitating surface of the transducer assembly is brought into closer proximity to the wall of the tank and the area of the cavitating surface of the transducer is effectively increased, thereby greatly improving the sonic cleaning process over what would otherwise be achieved with the ceramic operating without the transmission line extension.

Figure 3:
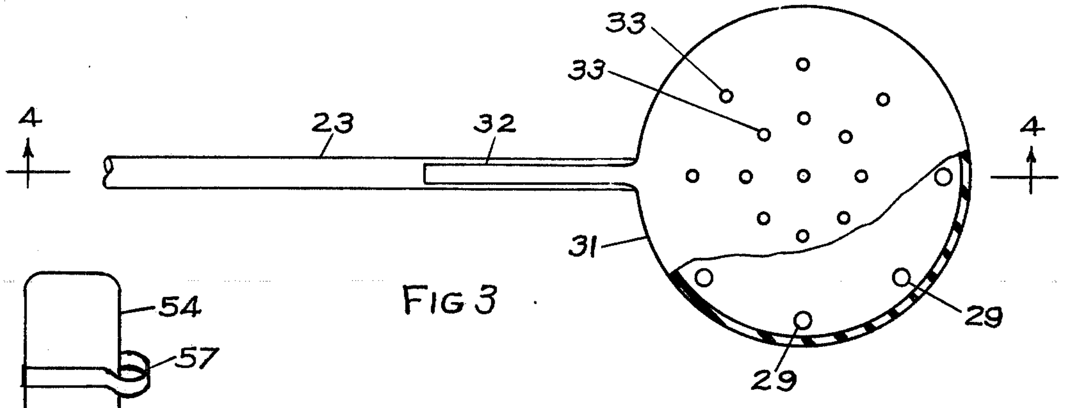
FIG. 3 is a partial cut-away plan view of a transducer construction illustrative of another embodiment of this invention.
Figure 4:
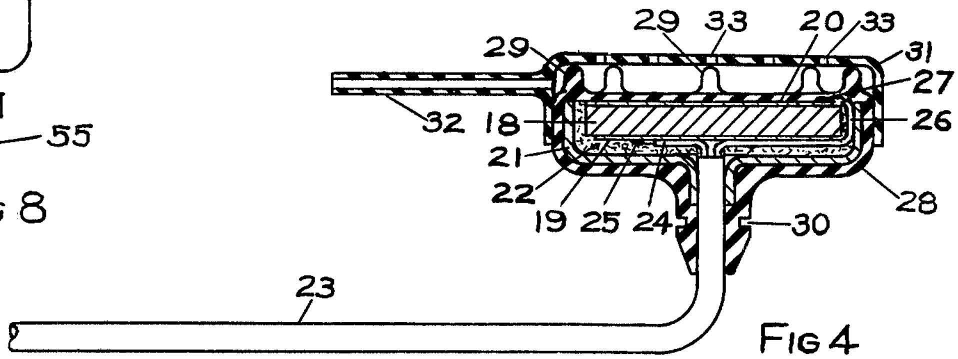
FIG. 4 is a section taken through the line 4—4 of FIG. 3.

FIGS. 3 and 4 illustrate another transducer construction which achieves the objects of this invention. The design provides means for bringing a vibrating surface of a transducer in close proximity to the wall of a structure being sonically cleaned, and includes a means for maintaining a liquid interface between the transducer surface and the wall. For illustrative purposes, the transducer design employs a polarized ceramic disc 18 which includes the conventional metallic electrode surfaces 19 and 20, as illustrated in FIG. 4. It will be obvious to any one skilled in the art that other well-known transducer materials, such as magnetostrictive elements, may be used as the vibratile element instead of the ceramic, if desired. The ceramic 18 is contained in a cup-shaped housing structure 21, and a layer of corprene 22, or similar acoustic isolation material, is interposed between the housing and the peripheral and bottom surfaces of the ceramic, as shown. A water-proof cable 23 is inserted through an opening in the bottom of the housing 21, as shown in FIG. 4. Conductor 24 is attached to the electrode 19 by means of the solder 25, and conductor 26 is connected to electrode 20 by means of solder 27. Both conductors 24 and 26 are recessed into clearance slots provided in the corprene 22. The cable and ceramic assembly is totally covered with a molded rubber covering 28 which provides a water-proof seal for the completed transducer. The rubber covering 28 is intimately bonded to the top radiating surface of the ceramic element.

The molded rubber covering 28 includes a number of protrusions 29 molded into the periphery of the front circular face of the molded rubber structure, as shown in FIGS. 3 and 4. The rubber protrusions serve as spacers for keeping the face of the transducer in close fixed proximity to the surface of a wall structure which is being sonically cleaned. The rubber tips 29 can be made small in diameter, and a large number of them molded around the periphery will serve as a brush for wiping away the residue from the ultrasonically-cleaned wall surface, as the transducer is moved over the surface of the wall. A circular groove 30 is molded into the cylindrical protrusion of the rubber covering which is used for the attachment of a support structure for holding the transducer assembly.

As an accessory for permitting the transducer to be used for sonically cleaning a dry wall surface, a rubber lid 31, which is perforated with an array of tiny holes 33, is dimensioned to fig tightly over the periphery of the rubber housing 28, and is provided with a tubular extension member 32, as shown. The purpose of the lid, when attached, as illustrated in FIG. 4, is to permit the tubular member 32 to be connected to a source of liquid, such as a portable tank of water or cleaning solution which will fill the space between the lid and the face of the transducer. The liquid will slowly trickle out through the small holes 33, thus insuring good acoustic coupling between the wall and the vibratile surface of the transducer when the assembly is moved about over the surface of the wall or article being ultrasonically cleaned.

Figure 8:
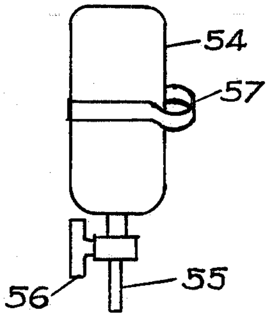
FIG. 8 illustrates a liquid container attachment for use with the transducer shown in FIG. 4.
Figure 5:
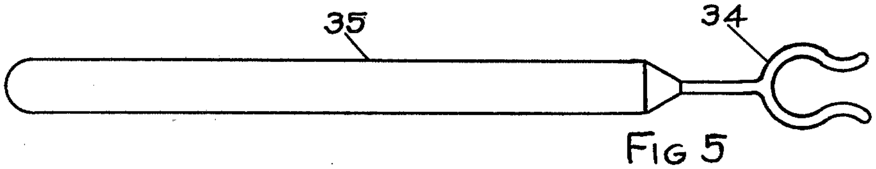
FIG. 5 is a view of a support structure for mounting the transducer illustrated in FIG. 4.

FIG. 5 illustrates a support structure for holding the transducer assembly shown in FIG. 4. The stem portion 35 serves as a handle, and the circular spring member 34 is designed to be pressed into the groove 30 to clamp the transducer in place. The spring 34 and the grooved rubber section of the transducer which is attached are both flexible for permitting the transducer to swivel so that the face of the transducer easily adjusts its position to follow the contour of the surface being sonically cleaned. With the handle in place, the assembly becomes an ultrasonic cleaning brush which will be very effective in removing stains from surfaces such as toilet fixtures and industrial mixing vats. If the surface to be cleaned is submerged in water, such as the walls of a toilet bowl, the perforated rubber cap 31 may be removed, and the peripheral rubber projections 29 will serve as a spacer for keeping the transducer face in close proximity to the submerged wall surface being cleaned. The projections 29 will also serve as a brush to wipe away the ultrasonically loosened stains from the wall surface. In applications where the stains are difficult to remove and cleaning agents are required, the perforated cap 1 may be attached, and the cleaning liquid may be supplied in a plastic bottle 54, as illustrated in FIG. 8. The liquid is discharged through a tubular spout 55 which makes a tight fit into the opening of the rubber tube 32. A valve 56 is schematically shown for controlling the discharge rate of the liquid being dispensed from the bottle. A clamping structure 57 is illustrated for attaching the liquid container 54 to the handle 35. When the structures shown in FIGS. 4, 5, and 8 are totally assembled, a hand-held ultrasonic cleaning brush is produced which can be conveniently moved about to perform ultrasonic cleaning operations with the same convenience and ease of handling as a conventional toilet brush. For use in cleaning dry wall surfaces, the bottle 54 may be filled with water or with water plus added detergent, so that liquid acoustic coupling is automatically provided by the inventive transducer construction illustrated in FIGS. 3 and 4 when it is being used to sonically clean dry wall surfaces.

Figure 7:
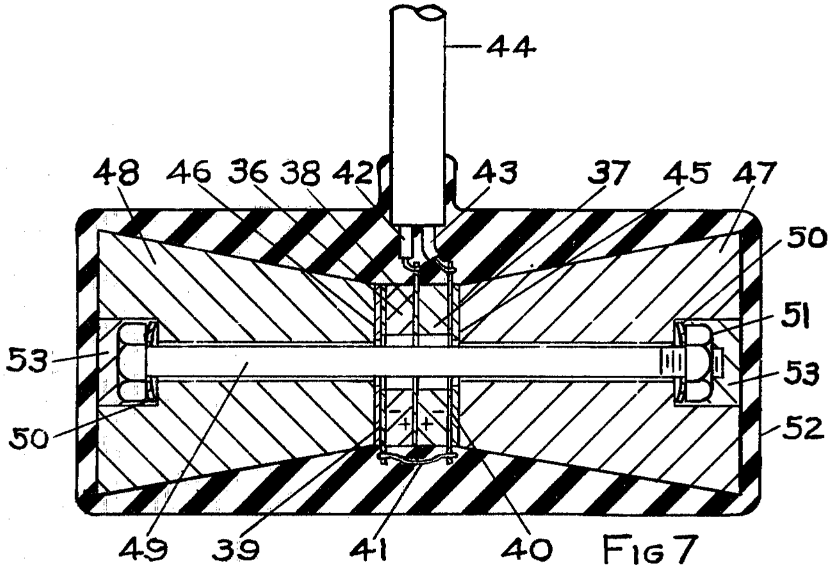
FIG. 7 is a section taken along the line 7—7 of FIG. 6.
Figure 6:
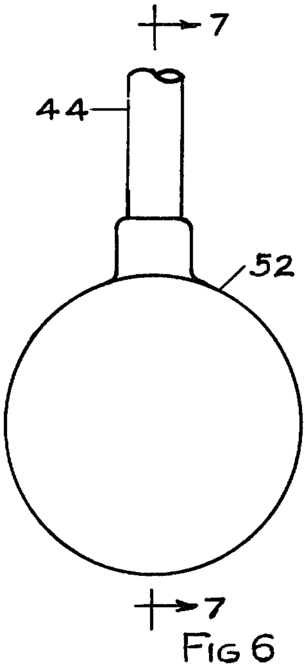
FIG. 6 is a view of a transducer construction illustrative of another embodiment of this invention.

The transducer construction shown in FIGS. 6 and 7 illustrates another transducer construction with means for extending the vibratile surfaces of a piston vibrator in a similar manner as was accomplished by the use of the annulus-shaped transmission line extension described earlier in connection with FIGS. 1 and 2. The dual piston vibrator comprises the ceramic discs 36 and 37 shown in cross-section in FIG. 7. The common polarity electrode surfaces marked plus (+) face each other and make electrical contact with a common thin metal foil terminal electrode 38 which includes an external tab portion to which the cable conductor 42 is soldered for establishing electrical connection. The other electrode surfaces of the ceramic discs marked minus (−) make electrical contact with the thin metal foil terminal electrodes 39 and 40, as illustrated. A wire 41 is soldered to the external tab portions of the electrodes 39 and 40, as shown in the drawing. The cable conductor 43 is electrically connected to electrode 40, thereby completing the connections from the ceramic discs to the water-proof cable 44. A ceramic insulator 45 is placed between the surfaces of the solid acoustic transmission line member 47 and electrode 40, and a similar ceramic insulator 46 is located between the surfaces of the transmission line member 48 and electrode 39, as illustrated in FIG. 7. A suitable cement, such as epoxy, is applied between all the mating surfaces of the assembled members, and the bolt 49, which passes through a clearance hold provided in each of the assembled members, clamps the assembly securely together. A Belleville spring washer 50 is preferably placed under the head of the bolt and under the nut 51, as shown, so that the desired compressive stress bias on the transducer elements 36 and 37 may be controlled. The preferred value of compressional stress bias to be applied to the ceramic elements should be in the approximate range 2000 to 4000 psi.

The transmission line members 47 and 48 may be tapered, if necessary, as shown in the drawing, to make the diameter of the radiating end of the transmission line members greater than approximately one-third wavelength of sound generated in the liquid within which the transducer is immersed. It is also advantageous for efficient operation to adjust the axial length of the assembly so that the vibrating structure operates at resonance at the desired frequency of operation.

After assembling the mechanical structure and cable, a rubber-like compound 52 is potted or molded, as illustrated, to encapsulate the components and to provide a water-proof covering for the transducer assembly. It is necessary to provide an intimate bond between the end faces of the transmission line extension members 47 and 48 and the molded rubber covering 52 to insure efficient transmission of acoustic energy into the liquid.

The transducer assembly shown in FIG. 7 achieves the same objective as the transducer illustrated in FIG. 2; that is, the vibrating surface of the ceramic is extended to a region in closer proximity to the wall of a tank within which the transducer is immersed for the purpose of ultrasonically cleaning the inner wall surface of the tank. Before the rubber covering 52 is molded to the structure, it is preferable to fill the spaces over the bolt head and nut with a solid material 53, such as epoxy, to provide a rigid plane surface for molding the rubber compound.

The transducer construction illustrated in FIG. 7 generates intense cavitation sound pressures primarily into a limited conical region immediately opposite each radiating end face of the extension members 47 and 48. It is necessary, therefore, when sonically cleaning the walls of a tank that the axis of the transducer along the center line of the cable 44 be rotated while the transducer is lowered or raised along the axis of the tank so that the concentrated regions of ultrasonic energy being generated at each end of the transducer vibratile assembly scans the complete area of the tank wall which is being cleaned. To increase the speed of cleaning, it is possible to mount a plurality of transducer assemblies with their vibratile axes mutually rotated from one another to minimize or eliminate the rotational requirement while lowering the transducer into the tank. For example, two transducer structures can be mounted with their axes perpendicular, or three transducers can be mounted with their axes rotated 60° in relative bearing.

Although the transducers have been described in connection with their primary intended application for achieving improvements in sonic cleaning, the novel structures may be used advantageously in other applications. For example, the novel transducer combination illustrated in FIG. 4 could be used as a body brush in a bath tube or shower to give beneficial massage to the body. Bath oils or body lotions could be supplied from a container 54 attached to the inlet tube 32. It will be obvious to those skilled in the art that numerous departures may be made from the details shown. Therefore, the invention should not be limited to the specific equipment shown herein. Quite the contrary, the appended claims should be construed to cover all equivalents falling within the true spirit and scope of the invention.

I claim:

1. In combination in an electroacoustic transducer adapted for sonic cleaning the wall surface of a vessel whose area is large compared with the area of the transducer, a water-proof housing structure enclosing a vibratile transducer element, means for operating said vibratile element at alternating displacements of specified amplitude and frequency, means for transmitting said alternating displacements to an exposed surface of said housing structure, mounting means for supporting said transducer, said mounting means characterized in that said exposed vibratile surface of said transducer may be conveniently moved relative to the surface of said wall, spacing means associated with said exposed vibratile surface, said spacing means characterized in that it serves to keep the said exposed vibratile transducer surface in relatively close spaced proximity to said wall surface as said transducer is moved relative to the surface of said wall, said spacing means including a perforated thin walled outer cover attached to said water proof housing structure and located opposite said exposed vibratile transducer surface whereby a confined space results between said perforated cover and said vibratile transducer surface, an inlet opening communicating into said confined space a reservoir of sound-conducting liquid, means for transferring a quantity of said liquid from said reservoir through said inlet opening to keep said space confined filled with said liquid as said transducer is moved relative to the surface of said wall, said sound transmitting liquid which fills said space characterized in that it slowly leaks from said confined space through said perforated cover to establish acoustic coupling between the transducer vibratile surface and said wall surface being cleaned, the amplitude and frequency of said vibratile exposed surface of said transducer being of such magnitude as to cause cavitation in the liquid which fills the space between said exposed transducer surface and said wall surface.

2. The invention in claim 1 characterized in that the exposed vibratile suface of said transducer is an approximately circular area, and still further characterized in that the diameter of said vibratile surface is greater than one-third wavelength of the sound generated in the liquid at the frequency of vibration of said transducer.

3. The invention in claim 1 further characterized in that a mounting structure is attached to said transducer which serves as a handle for transporting the transducer over the surface area into which sonic energy is to be applied.

4. The invention in claim 3 further characterized in that said reservoir of sound conducting liquid includes a container holding a supply of liquid, and further characterized in that said container is attached to said mounting structure, whereby a portable sonic energy applicator is achieved with a self-contained supply of liquid for use as a coupling medium.

5. The invention in claim 4 characterized in that said liquid is a body lotion.

6. The invention in claim 4 characterized in that said liquid is a cleaning agent.

7. The invention in claim 1 characterized in that said vibratile transducer element is a polarized ceramic disc.

8. The invention in claim 7 further characterized in that the frequency of operation of said polarized ceramic disc is near its planar resonance frequency mode of vibration.

* * * * *